United States Patent
Yu et al.

(10) Patent No.: US 8,849,544 B2
(45) Date of Patent: Sep. 30, 2014

(54) METHOD OF PREDICTING NOX GENERATION AMOUNT

(75) Inventors: Jun Yu, Suwon-si (KR); Kihoon Nam, Gunpo-si (KR); Kyoungchan Han, Hwaseong-si (KR); KyoungDoug Min, Seoul (KR); Junyong Lee, Seoul (KR); Wonah Park, Seoul (KR)

(73) Assignees: Hyundai Motor Company, Seoul (KR); SNU R&DB Foundation, Seoul (KR)

( * ) Notice: Subject to any disclaimer, the term of this patent is extended or adjusted under 35 U.S.C. 154(b) by 252 days.

(21) Appl. No.: 13/551,095

(22) Filed: Jul. 17, 2012

(65) Prior Publication Data

US 2013/0131954 A1    May 23, 2013

(51) Int. Cl.
*F01N 11/00* (2006.01)
*F01N 9/00* (2006.01)
*F01N 3/18* (2006.01)
*F02D 35/02* (2006.01)
*F02D 41/14* (2006.01)
*F02D 41/00* (2006.01)

(52) U.S. Cl.
CPC .............. *F01N 11/00* (2013.01); *F02D 35/028* (2013.01); *F01N 3/18* (2013.01); *F02D 41/1454* (2013.01); *Y02T 10/47* (2013.01); *F02D 2200/101* (2013.01); *F02D 41/0072* (2013.01); *F01N 9/00* (2013.01); *F02D 41/1462* (2013.01); *F02D 35/02* (2013.01); *F02D 35/023* (2013.01); *F02D 2200/0614* (2013.01); *F02D 35/026* (2013.01)
USPC .......................................... 701/102; 123/435

(58) Field of Classification Search
USPC .......... 701/101, 102, 109; 123/435, 677, 678; 60/274, 276; 73/23.31
See application file for complete search history.

(56) References Cited

U.S. PATENT DOCUMENTS 6,775,623 B2 *   8/2004   Ali et al. ........................... 702/31
7,613,561 B1 *  11/2009   Stewart et al. ................. 701/109
2013/0131967 A1 *  5/2013   Yu et al. ......................... 701/115

FOREIGN PATENT DOCUMENTS

| JP | 2004-132379 A | 4/2004 |
| JP | 2004-293413 A | 10/2004 |
| JP | 2008-184908 A | 8/2008 |
| JP | 4706134 B2 | 3/2011 |

* cited by examiner

*Primary Examiner* — Mahmoud Gimie
(74) *Attorney, Agent, or Firm* — Morgan, Lewis & Bockius LLP

(57) ABSTRACT

A method of predicting NOx generation amount may include calculating NO generation rate by using a combustion pressure of an engine and driving variables of the engine, obtaining NO generation period by using the combustion pressure of the engine, calculating NO generation amount based on the NO generation rate and the NO generation period, and predicting the NOx generation amount by obtaining $NO_2$ generation amount based on a ratio between NO and $NO_2$ according to the NO generation amount and a driving condition of the engine.

9 Claims, 4 Drawing Sheets

METHOD OF PREDICTING NOX GENERATION AMOUNT

CROSS-REFERENCE TO RELATED APPLICATION

The present application claims priority of Korean Patent Application Number 10-2011-0122437 filed Nov. 22, 2011, the entire contents of which application is incorporated herein for all purposes by this reference.

BACKGROUND OF INVENTION

1. Field of Invention

The present invention relates to a method of predicting NOx generation amount. More particularly, the present invention relates to a method of predicting NOx generation amount that can predict NOx amount generated in an engine of a vehicle without an additional NOx sensor.

2. Description of Related Art

As emission regulations for vehicles having an internal combustion engine becomes stricter and stricter, it is required for reducing emission during operation of the internal combustion engine. One method for reducing emission is to reduce emission generated in each cylinder of the internal combustion engine during combustion of an air/fuel mixture.

Another method for reducing emission is to use a post-processing system of an exhaust gas in the internal combustion engine. The post-processing system of the exhaust gas is adapted to convert noxious materials generated at each cylinder during combustion of the air/fuel mixture into harmless materials. For this purpose, catalytic converters are used for converting carbon monoxide, hydrocarbon, and nitrogen oxide into harmless material.

In order to efficiently convert noxious materials by using the catalytic converters of the exhaust gas, it is necessary to precisely predict the NOx amount generated in the engine.

According to conventional arts, devices for analyzing the exhaust gas or sensors for detecting the NOx amount are used so as to predict the NOx amount precisely. If the devices for analyzing the exhaust gas or the sensors for detecting the NOx amount, cost may increase. In addition, compositions in the engine exhaust gas may contaminate the devices for analyzing the exhaust gas or the sensors for detecting the NOx amount and the sensors themselves are out of order.

In order to solve above-mentioned problems, technique for predicting NOx amount is developed. Reliability, however, may be deteriorated according to the technique due to very complicated calculation processes and very simplified assumptions for simplifying the calculation processes.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present invention provide for a method of predicting NOx generation amount having advantages of precisely predicting NOx amount in real time by using a combustion pressure and driving variables of an engine without additional devices for analyzing an exhaust gas or sensors for detecting the NOx amount.

Various aspects of the present invention provide for a method of predicting NOx generation amount that includes calculating NO generation rate by using a combustion pressure of an engine and driving variables of the engine, obtaining NO generation period by using the combustion pressure of the engine, calculating NO generation amount based on the NO generation rate and the NO generation period, and predicting the NOx generation amount by obtaining $NO_2$ generation amount based on a ratio between NO and $NO_2$ according to the NO generation amount and a driving condition of the engine.

The driving variables of the engine may include at least one of a fuel amount, an engine speed (RPM), an air/fuel ratio (AF), and an EGR information.

The NO generation rate may be calculated by using a burned gas temperature in a combustion chamber and an oxygen concentration and nitrogen concentration in the combustion chamber.

The NO generation rate may be calculated from:

$$\frac{d[NO]}{dt} = \frac{A}{T^{1/2}} \exp\left(\frac{B}{T}\right) [O_2]^{1/2} [N_2]$$

wherein $d[NO]/dt$ is the NO generation rate to a time, T is a burned gas temperature, $[O_2]$ is an oxygen concentration in a combustion chamber, $[N_2]$ is nitrogen concentration in the combustion chamber, and A and B are constants.

The burned gas temperature ($T=T_{burned\,gas}$) may be calculated by taking into account of adiabatic flame temperature ($T_{ad}$) and a temperature rise of the burned gas in the combustion chamber due to pressure rise at combustion.

The burned gas temperature ($T=T_{burned\,gas}$) is calculated from $$T_{burned\,gas} = T_{ad} \times \left(\frac{P_{max}}{P_i}\right)^{\frac{k-1}{k}},$$

wherein $T_{burned\,gas}$ is the burned gas temperature (T), $T_{ad}$ is an adiabatic flame temperature, $P_i$ is a pressure at a start of combustion, $P_{max}$ is a maximum combustion pressure, and k is a specific heat ratio.

The adiabatic flame temperature ($T_{ad}$) may be calculated from $T_{ad}=(5.7401\times[O_2]^2-4.6043\times[O_2]+1.2616)\times T_{soc}+(-22072\times[O_2]^2+16718\times[O_2]-302.76)$, wherein $T_{soc}$ is a temperature in combustion chamber at the start of combustion and $[O_2]$ is the oxygen concentration in the combustion chamber.

The oxygen concentration $[O_2]$ and the nitrogen concentration $[N_2]$ in the combustion chamber may be calculated from:

$O_{2\_in}=(1-EGR\_rate)\times O_{2\_Air}[vol,\%]+EGR\_rate\times O_{2\_EGR}[vol,\%]$ $N_{2\_in}=(1-EGR\_rate)\times N_{2\_Air}[vol,\%]+EGR\_rate\times N_{2\_EGR}[vol,\%]$, wherein $O_{2\_in}$ and $N_{2\_in}$ are the oxygen concentration $[O_2]$ and the nitrogen concentration $[N_2]$ in the combustion chamber, $O_{2\_Air}$ [vol,%] and $N_{2\_Air}$ [vol,%] are concentrations of the oxygen and the nitrogen in an air, and $O_{2\_EGR}$ [vol,%] and $N_{2\_EGR}$ [vol,%] are concentrations of the oxygen and the nitrogen in an EGR gas.

The NO generation period may be obtained by using an MFB 40-80 region or an MFB 50-90 region.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention (s) is/are intended to cover not only the exemplary embodiments, but also various alternatives, modifications, equivalents and other embodiments, which may be included within the spirit and scope of the invention as defined by the appended claims.

Figure 1:
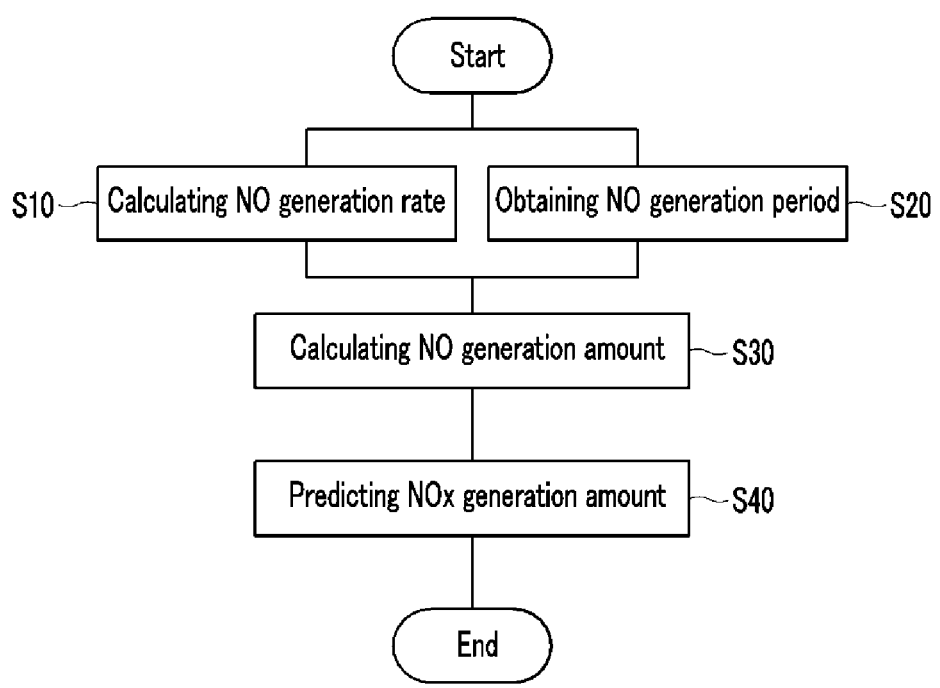
FIG. 1 is a flowchart of an exemplary method of predicting NOx generation amount according to the present invention.
Figure 2:
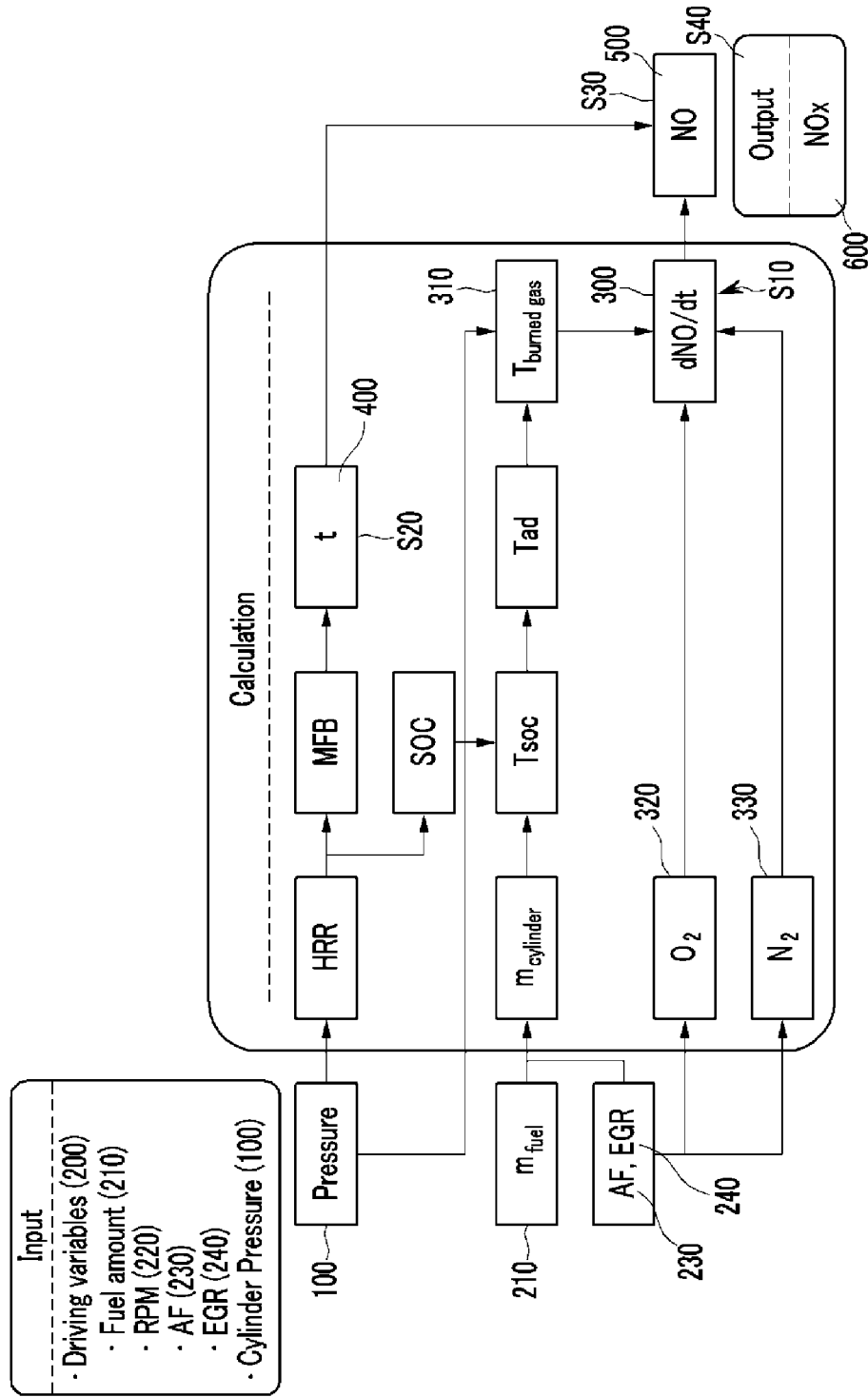
FIG. 2 is a block diagram of an exemplary method of predicting NOx generation amount according to the present invention.

FIG. 1 is a flowchart of a method of predicting NOx generation amount according to various embodiments of the present invention, and FIG. 2 is a block diagram of a method of predicting NOx generation amount according to various embodiments of the present invention.

As shown in FIG. 1 and FIG. 2, a method of predicting NOx generation amount according to various embodiments of the present invention includes calculating NO generation rate 300 by using a combustion pressure 100 of an engine and driving variables 200 of the engine at a step S10, obtaining NO generation period 400 by using the combustion pressure 100 of the engine at a step S20, calculating NO generation amount 500 based on the NO generation rate 300 and the NO generation period 400 at a step S30, and predicting the NOx generation amount at a step S40 by obtaining NO2 generation amount based on a ratio between NO and NO$_2$ according to the NO generation amount 500 and the driving condition of the engine.

Firstly, the NO generation amount 300 is calculated by using the combustion pressure 100 of the engine and the driving variables 200 of the engine at the step S10.

The driving variables 200 of the engine, as shown in FIG. 2, include a fuel amount 210 ($m_{fuel}$), an engine speed 220 (RPM), an air/fuel ratio 230 (AF), and an EGR information 240 such as an EGR amount and an EGR rate (EGR_rate). The NO generation rate 300 is calculated based on the driving variables 200 of the engine.

In various embodiments, the NO generation rate 300 is calculated from Equation 1.

$$\frac{d[NO]}{dt} = \frac{A}{T^{1/2}} \exp\left(\frac{B}{T}\right) [O_2]^{1/2} [N_2] \quad \text{(Equation 1)}$$

In the equation 1, d[NO]/dt is the NO generation rate 300, T is a burned gas temperature 310, [O$_2$] is an oxygen concentration 320 in a combustion chamber, [N$_2$] is a nitrogen concentration 330 in the combustion chamber, and A and B are constants obtained by experiments or analyses.

Therefore, the burned gas temperature (T) 310, the oxygen concentration [O$_2$] 320, and the nitrogen concentration [N$_2$] 330 in the combustion chamber should be known in order to calculate the NO generation rate 300 (d[NO]/dt).

Hereinafter, processes for obtaining the burned gas temperature (T), the oxygen concentration [O$_2$], and the nitrogen concentration [N$_2$] in the combustion chamber will be described.

The burned gas temperature (T=T$_{burned\ gas}$) 310 in the combustion chamber can be calculated by taking into account of an adiabatic flame temperature (T$_{ad}$) and a temperature rise in the combustion chamber due to pressure rise at combustion.

In various embodiments, the flame temperature 310 in the combustion chamber can be calculated from equation 2.

$$T_{burned\ gas} = T_{ad} \times \left(\frac{P_{max}}{P_i}\right)^{\frac{k-1}{k}} \quad \text{(Equation 2)}$$

In the equation 2, T$_{burned\ gas}$ is the burned gas temperature (T) 310, T$_{ad}$ is the adiabatic flame temperature, P$_i$ is a pressure at a start of combustion, P$_{max}$ is a maximum combustion pressure, and k is a specific heat ratio, that is a ratio of Cv (specific heat under constant volume) to Cp (specific heat under constant pressure).

The P$_i$ (the pressure at the start of combustion) and the P$_{max}$ (the maximum combustion pressure) can be detected by a combustion pressure sensor of the engine that detects the combustion pressure 100 of the engine, and information thereon is converted into an electric signal and is transmitted to the control portion such as the ECU (Electric Control Unit) of the vehicle.

In various embodiments, the adiabatic flame temperature (T$_{ad}$) in the equation 2 can be calculated from equation 3.

$$T_{ad} = (5.7401 \times [O_2]^2 - 4.6043 \times [O_2] + 1.2616) \times T_{soc} + (-22072 \times [O_2]^2 + 16718 \times [O_2] - 302.76) \quad \text{(Equation 3)}$$

In the equation 3, T$_{soc}$ is a temperature in the combustion chamber at the start of combustion and [O$_2$] is the oxygen concentration 320 in the combustion chamber.

As shown in FIG. 2, the start of combustion (SOC) is determined from the combustion pressure 100 in the combustion chamber and a heat release rate (HRR), and the temperature (T$_{soc}$) in the combustion chamber at the start of combustion is obtained by using the determined start of combustion (SOC).

In various embodiments, the temperature (T$_{soc}$) in the combustion chamber at the start of combustion can be obtained from equation 3-1.

$$T_{soc} = P_i V/mR \quad \text{(Equation 3-1)}$$

Herein, the P$_i$ is pressure at the start of combustion and is detected by the combustion pressure sensor of the engine at the above-determined start of combustion (SOC), and the R is gas constant of ideal gas equation.

In addition, the m represents an amount of a gas mixture in the cylinder and can be obtained from equation 3-2.

$$m = AF \times m_{fuel}/(1-EGR\_rate) \quad \text{(Equation 3-2)}$$

Herein, AF is an air/fuel ratio 230 and $m_{fuel}$ is the fuel amount 210 that can be known from an ECU signal of the vehicle. Both of the AF and the $m_{fuel}$ are input as the driving variables 200 of the engine.

Meanwhile, the V is a volume at the start of combustion and can be calculated from equation 3-3.

$$V/V_c = 1 + \frac{1}{2}(r_c-1)\left[R+1-\cos\theta-\sqrt{R^2-\sin^2\theta}\right] \quad \text{(Equation 3-3)}$$

$$V_c = \pi \times \frac{1}{4} \times B^2 \times S$$

$$R = r/a$$

Herein, $V_c$ is a clearance volume, $r_c$ is a compression ratio, r is a length of a connecting rod, a is a crank offset, B is a cylinder diameter, and S is a stroke of a piston.

Therefore, the temperature ($T_{soc}$) in the combustion chamber at the start of combustion can be obtained by substituting m and V calculated from equation 3-2 and equation 3-3 into equation 3-1.

Meanwhile, the oxygen concentration [$O_2$] in the combustion chamber should be calculated so as to obtain the adiabatic flame temperature ($T_{ad}$), and this process will hereinafter be described.

If the oxygen concentration [$O_2$] 320 in the combustion chamber is obtained, the adiabatic flame temperature ($T_{ad}$) can be known from equation 3 as shown in FIG. 2, and the burned gas temperature (T=$T_{burned\,gas}$) 310 in the combustion chamber can be also obtained by using the adiabatic flame temperature ($T_{ad}$).

In various embodiments, the oxygen concentration [$O_2$] and the nitrogen concentration [$N_2$] in the combustion chamber shown in equation 1 can be calculated from equation 4.

$$O_{2\_in} = (1-\text{EGR\_rate}) \times O_{2\_Air}[\text{vol},\%] + \text{EGR\_rate} \times O_{2\_EGR}[\text{vol},\%]$$

$$N_{2\_in} = (1-\text{EGR\_rate}) \times N_{2\_Air}[\text{vol},\%] + \text{EGR\_rate} \times N_{2\_EGR}[\text{vol},\%] \quad \text{(Equation 4)}$$

In the equation 4, $O_{2\_in}$ and $N_{2\_in}$ are the oxygen concentration [$O_2$] and the nitrogen concentration [$N_2$] in the combustion chamber, the EGR_rate is the EGR rate, $O_{2\_Air}$ [vol,%] and $N_{2\_Air}$ [vol,%] are concentrations of oxygen and nitrogen in an air, and $O_{2\_EGR}$ [vol,%] and $N_{2\_EGR}$ [vol,%] are concentrations of oxygen and nitrogen in an EGR gas.

That is, the oxygen concentration [$O_2$] 320 in the combustion chamber can be obtained based on the oxygen concentration $O_{2\_Air}$ [vol,%] in the intake air and the oxygen concentration $O_{2\_EGR}$ [vol,%] in the EGR gas, and the nitrogen concentration [$N_2$] 330 in the combustion chamber can be obtained based on the nitrogen concentration $N_{2\_Air}$ [vol,%] in the intake air and the nitrogen concentration $N_{2\_EGR}$ [vol,%] in the EGR gas.

The EGR rate (EGR_rate) is a recirculation ratio of the exhaust gas, and can be calculated from EGR gas amount/(EGR gas amount+intake air amount)*100 or from a ratio between a value obtained by subtracting carbon dioxide concentration in the atmosphere from carbon dioxide concentration in an intake pipe and a value obtained by subtracting carbon dioxide concentration in the atmosphere from carbon dioxide concentration in the exhaust gas.

The $O_{2\_Air}$ [vol,%] and the $N_{2\_Air}$ [vol,%] are concentrations of the oxygen and the nitrogen in the intake air and can be replaced by oxygen concentration and nitrogen concentration in the atmosphere.

The $O_{2\_EGR}$ [vol,%] and the $N_{2\_EGR}$ [vol,%] are oxygen concentration and nitrogen concentration in the EGR gas and can be calculated from equation 4-1 to equation 4-3.

$$O_{2\_EGR}[\text{vol},\%] = O_{2\_EGR}/\text{Total\_Vol}$$

$$N_{2\_EGR}[\text{vol},\%] = N_{2\_EGR}/\text{Total\_Vol}$$

$$\text{Total\_Vol} = O_{2\_EGR} + N_{2\_EGR} + CO_{2\_EGR} + H_2O_{\_EGR} \quad \text{(Equation 4-1)}$$

$$O_{2\_EGR} = 1-z$$

$$N_{2\_EGR} = Q$$

$$CO_{2\_EGR} = z \times e$$

$$H_2O_{\_EGR} = 2 \times (1-e) \times z \quad \text{(Equation 4-2)}$$

$$z = AF_{stoi}/AF$$

$$e = 4/(4+y)$$

$$y = H/C\_ratio \quad \text{(Equation 4-3)}$$

In the equation 4-3, the AF is the air/fuel ratio 230 and represents a ratio of weight of the air to that of the fuel used in combustion. In various embodiments of the present invention, the AF is detected as one of the driving variables 200 of the engine and is input. In addition, the $AF_{stoi}$ is a stoichiometric air/fuel ratio and is determined according to kind of the fuel. The $AF_{stoi}$ is an ideal air/fuel ratio of a corresponding fuel. The y is determined according to kind of the fuel and is defined as a ratio of hydrogen (H) to carbon (C) (y=H/C_ratio) in each molecular formula of the corresponding fuel.

In the equation 4-2, the Q is a component ratio of nitrogen in the EGR gas and is determined according to the fuel. For example, Q may be 3.773 in a case of diesel fuel.

That is, only the air/fuel ratio (AF) 230 is detected and is substituted in equation 4-1 to equation 4-3, and remaining Q, $AF_{stoi}$ and y are determined according to kind of the fuel.

Therefore, the $O_{2\_EGR}$ [vol,%] and the $N_{2\_EGR}$ [vol,%] in equation 4-1 can be calculated from equation 4-3 and equation 4-2, and the oxygen concentration [$O_2$] and the nitrogen concentration [$N_2$] in the combustion chamber can be calculated by substituting the $O_{2\_EGR}$ [vol,%] and the $N_{2\_EGR}$ [vol,%] in equation 4.

As shown in FIG. 2, if the oxygen concentration [$O_2$] 320 in the combustion chamber obtained at the above-mentioned process is substituted in equation 3, the adiabatic flame temperature ($T_{ad}$) can be calculated and the burned gas temperature (T) 310 is calculated from equation 2 based on the $T_{ad}$.

That is, because the burned gas temperature (T) 310, the oxygen concentration [$O_2$] 320, and the nitrogen concentration [$N_2$] 330 can be calculated, the NO generation rate (d[NO]/dt) 300 can also be calculated by substituting these values in equation 1 according to various embodiments of the present invention.

In addition, the NO generation period 400 is obtained by using the combustion pressure of the engine 100 at the step S20.

The NO generation period 400 is obtained by using phenomenon that NO generation is similar to a change of MFB (Mass Fraction Burned). For this purpose, heat release rate (HRR) is obtained from the combustion pressure 100 of the engine, the heat release rate (HRR) is integrated, and the MFB is calculated based on a point at which the heat release rate is maximized, as shown in FIG. 2.

The combustion pressure is analyzed so as to draw a graph (referring to one-point chain line in FIG. 3) for representing the change of the MFB (Mass Fraction Burned), and the NO generation period 400 is determined by using the graph.

Figure 3:
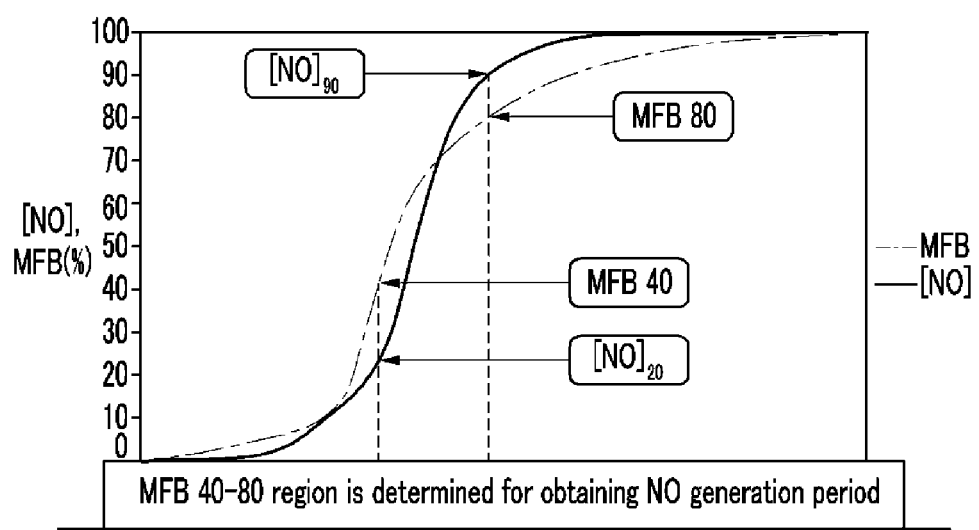
FIG. 3 is a graph for showing an exemplary NO generation period according to the present invention.

In various embodiments, the NO generation period 400 may be obtained by using MFB 40-80 region or MFB 50-90 region. If it is assumed that the NO generation period 400 is a region where 20%-90% of the NO is generated, a region of MFB corresponding to the region is the MFB 40-80 region as shown in FIG. 3. Therefore, the NO generation period 400 can be effectively obtained by using the MFB 40-80 region or the MFB 50-90 region. That is, the NO generation period 400 is a duration corresponding to the MFB 40-80 region or the MFB 50-90 region.

Figure 4:
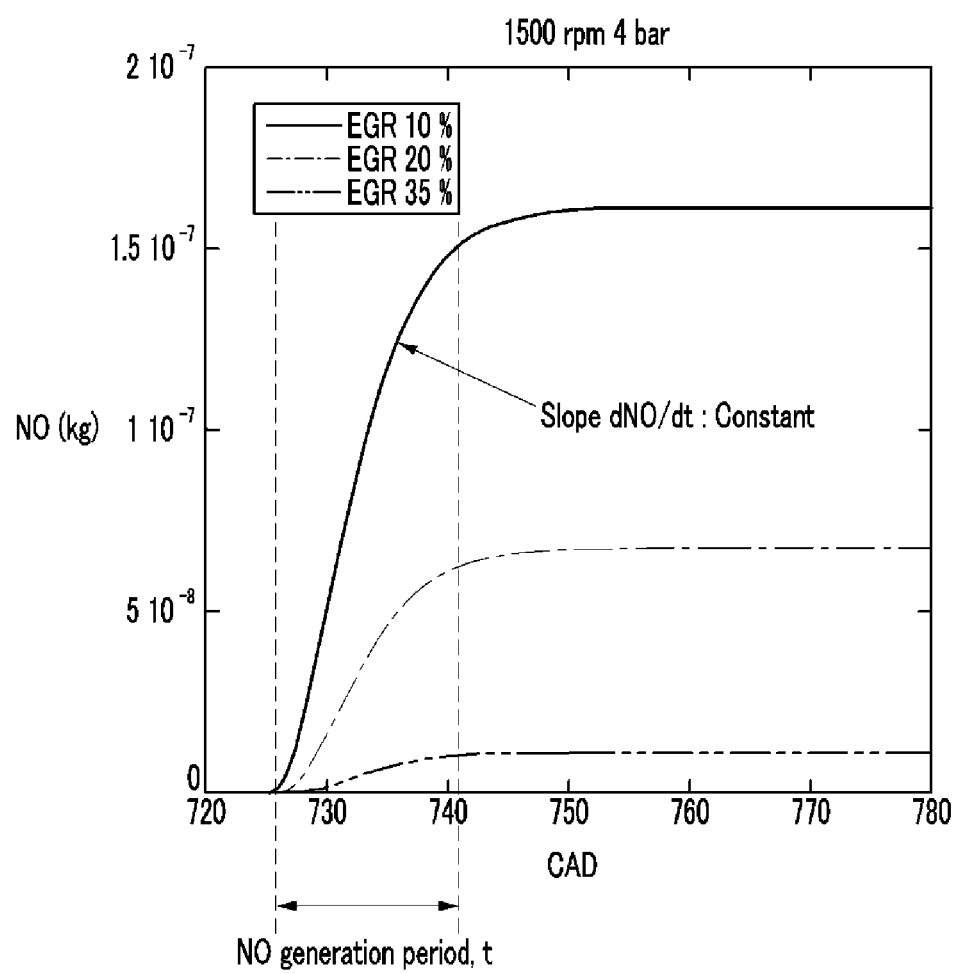
FIG. 4 is a graph for showing an exemplary NO generation amount according to the present invention.

If the NO generation period 400 is obtained, the NO generation amount 500 is calculated based on the NO generation rate (d[NO]/dt) 300 obtained from equation 1 and the NO generation period (t) 400 at the step S13, as shown in FIG. 4.

After that, the NOx generation amount 600 is predicted by obtaining NO2 generation amount based on a ratio between NO and NO$_2$ according to the NO generation amount 500 and the driving condition of the engine at the step S40.

In various embodiments, the NO$_2$ generation amount is obtained by means of the ratio between the NO generation amount 500 and the NO2 generation amount according to the driving conditions of the engine from an empirical formula.

In various embodiments, the NOx generation amount 600 can be predicted by adding up the NO generation amount 500 and the NO2 generation amount.

As described above, a method of predicting NOx generation amount according to various embodiments of the present invention can predict the NOx generation amount in real time by simple calculation based on a fuel amount, an engine speed, an air/fuel ratio, and an EGR information of a vehicle. Therefore, an additional NOx sensor is not necessary. Therefore, a method of predicting NOx generation amount according to various embodiments of the present invention is called a virtual sensor for detecting the NOx.

According to various embodiments of the present invention, cost may be reduced and reliability may be improved since there is no malfunction of a sensor.

For convenience in explanation and accurate definition in the appended claims, the terms upper or lower, front or rear, inside or outside, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method of predicting NOx generation amount, comprising:
    calculating NO generation rate by using a combustion pressure of an engine and driving variables of the engine;
    obtaining NO generation period by using the combustion pressure of the engine;
    calculating NO generation amount based on the NO generation rate and the NO generation period; and
    predicting the NOx generation amount by obtaining NO$_2$ generation amount based on a ratio between NO and NO$_2$ according to the NO generation amount and a driving condition of the engine.

2. The method of claim 1, wherein the driving variables of the engine include at least one of a fuel amount, an engine speed (RPM), an air/fuel ratio (AF), and an EGR information.

3. The method of claim 1, wherein the NO generation rate is calculated by using a burned gas temperature in a combustion chamber and an oxygen concentration and nitrogen concentration in the combustion chamber.

4. The method of claim 3, wherein the NO generation rate is calculated from:

$$\frac{d[NO]}{dt} = \frac{A}{T^{1/2}} \exp\left(\frac{B}{T}\right)[O_2]^{1/2}[N_2],$$

wherein d[NO]/dt is the NO generation rate to a time, T is a burned gas temperature, [O$_2$] is an oxygen concentration in a combustion chamber, [N$_2$] is nitrogen concentration in the combustion chamber, and A and B are constants.

5. The method of claim 4, wherein the burned gas temperature (T=T$_{burned\ gas}$) is calculated based on adiabatic flame temperature (T$_{ad}$) and a temperature rise of the burned gas in the combustion chamber due to pressure rise at combustion.

6. The method of claim 5, wherein the burned gas temperature (T=T$_{burned\ gas}$) is calculated from:

$$T_{burned\ gas} = T_{ad} \times \left(\frac{P_{max}}{P_i}\right)^{\frac{k-1}{k}},$$

wherein T$_{burned\ gas}$ is the burned gas temperature (T), T$_{ad}$ is an adiabatic flame temperature, P$_i$ is a pressure at a start of combustion, P$_{max}$ is a maximum combustion pressure, and k is a specific heat ratio.

7. The method of claim 6, wherein the adiabatic flame temperature (T$_{ad}$) is calculated from T$_{ad}$=(5.7401×[O$_2$]$^2$−4.6043×[O$_2$]+1.2616)×T$_{soc}$+(−22072×[O$_2$]$^2$+16718×[O$_2$]−302.76),
    wherein T$_{soc}$ is a temperature in combustion chamber at the start of combustion and [O$_2$] is the oxygen concentration in the combustion chamber.

8. The method of claim 7, wherein the oxygen concentration [O$_2$] and the nitrogen concentration [N$_2$] in the combustion chamber are calculated from:

$$O_{2\_in}=(1-EGR\_rate)\times O_{2\_Air}[vol,\%]+EGR\_rate\times O_{2\_EGR}[vol,\%]$$

$$N_{2\_in}=(1-EGR\_rate)\times N_{2\_Air}[vol,\%]+EGR\_rate\times N_{2\_EGR}[vol,\%],$$

wherein O$_{2\_in}$ and N$_{2\_in}$ are the oxygen concentration [O$_2$] and the nitrogen concentration [N$_2$] in the combustion chamber, O$_{2\_Air}$ [vol,%] and N$_{2\_Air}$ [vol,%] are concentrations of the oxygen and the nitrogen in an air, and O$_{2\_EGR}$ [vol,%] and N$_{2\_EGR}$ [vol,%] are concentrations of the oxygen and the nitrogen in an EGR gas.

9. The method of claim 6, wherein the NO generation period is obtained by using an MFB 40-80 region or an MFB 50-90 region.

* * * * *

UNITED STATES PATENT AND TRADEMARK OFFICE
CERTIFICATE OF CORRECTION

| | | |
|---|---|---|
| PATENT NO. | : 8,849,544 B2 | Page 1 of 1 |
| APPLICATION NO. | : 13/551095 | |
| DATED | : September 30, 2014 | |
| INVENTOR(S) | : Jun Yu et al. | |

It is certified that error appears in the above-identified patent and that said Letters Patent is hereby corrected as shown below:

On the title page, insert priority data as follows:

item --(30) Foreign Application Priority Data:

November 22, 2011 (KR) ...................... 10-2011-0122437--

Signed and Sealed this
Thirtieth Day of December, 2014

Michelle K. Lee
*Deputy Director of the United States Patent and Trademark Office*